April 24, 1934.  J. P. HEIL  1,955,807
TRUCK BODY
Filed Oct. 8, 1930  2 Sheets-Sheet 1
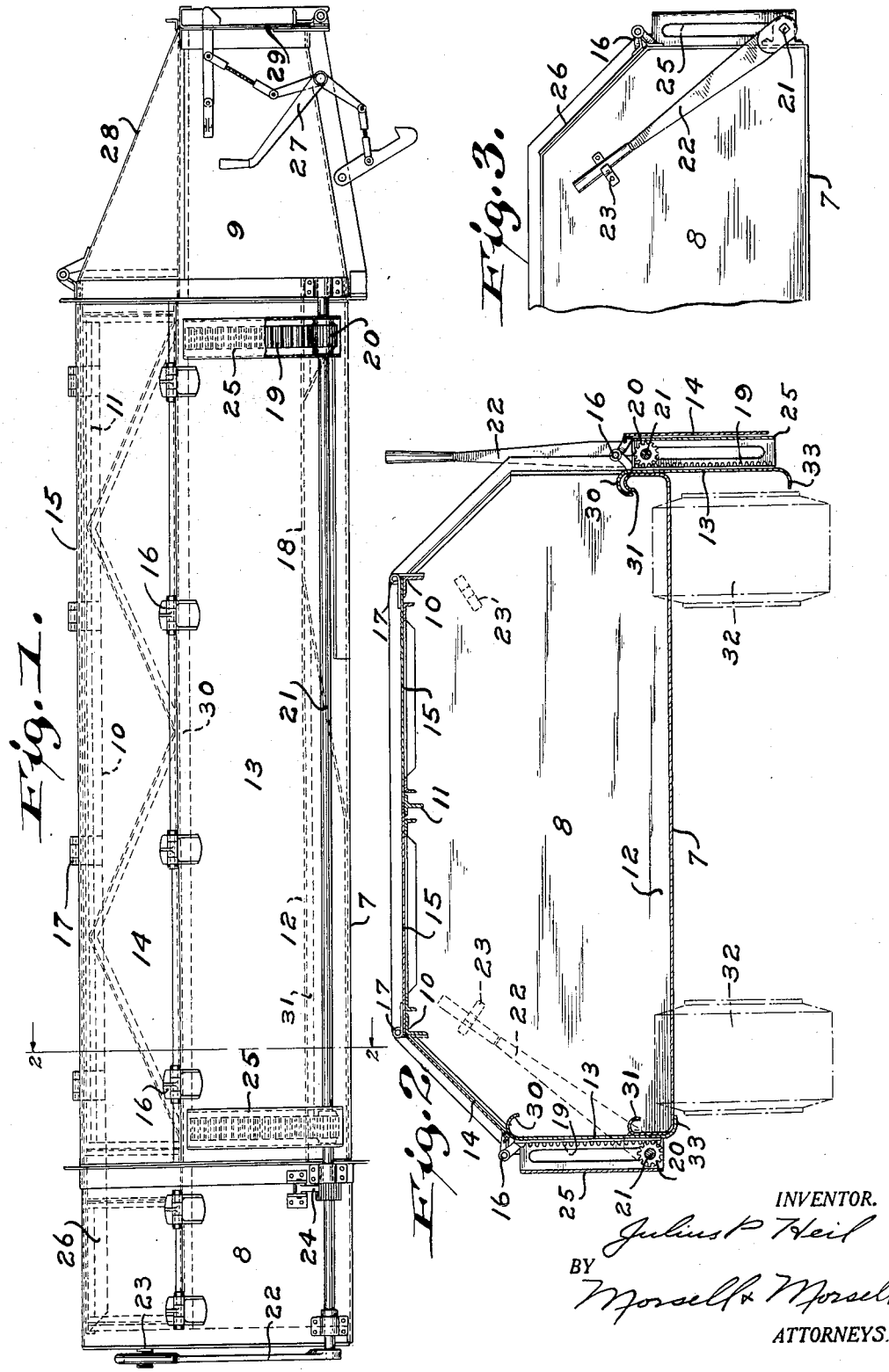
INVENTOR.
Julius P. Heil
BY
Morsell & Morsell
ATTORNEYS.

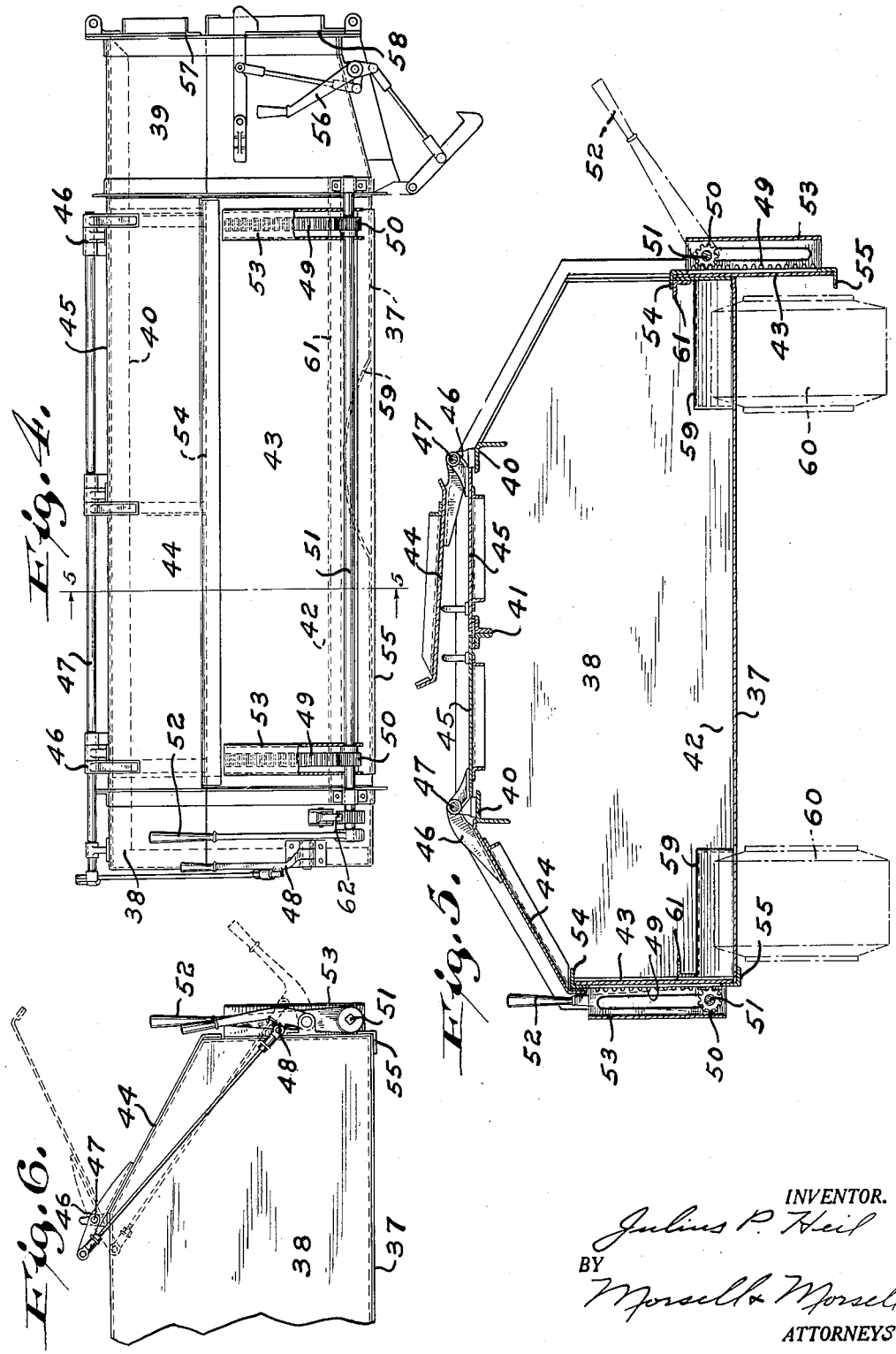

Patented Apr. 24, 1934

1,955,807

UNITED STATES PATENT OFFICE 1,955,807

TRUCK BODY

Julius P. Heil, Milwaukee, Wis., assignor to The Heil Co., Milwaukee, Wis., a corporation of Wisconsin Application October 8, 1930, Serial No. 487,105

11 Claims. (Cl. 296—100)

The present invention relates in general to improvements in portable receptacles, and relates more specifically to improvements in the construction and operation of truck bodies especially adapted for the transportation of bulk materials such as garbage, street sweepings or the like.

A general object of the invention is to provide an improved portable receptacle such as a truck body, which may be conveniently loaded and emptied.

It is a relatively simple matter to unload the ordinary tiltable truck body containing bulk materials such as garbage, street sweepings, ashes, sand, gravel and the like, by merely tilting the body and thus causing the load to slide by gravity through the rear doors usually provided for unloading purposes. The loading of such prior portable receptacles, however, presents a more difficult problem, and is customarily accomplished by means of steam shovels, elevators, or other mechanisms adapted to hoist the material from the ground and to deposit it through the open top of the body. The sides of these prior truck bodies must be of sufficient height to insure desirable capacity, and when thus constructed, are too high to permit convenient loading by hand and from the ground, over the truck body side walls.

It is a more specific object of the present invention to provide an improved truck body which may be readily loaded with any kind of material including garbage, ashes, street sweepings or the like, by hand and from the ground level, even by relatively small individuals.

Another specific object of the invention is to provide a portable receptacle wherein the side walls may be gradually raised or lowered to vary the depth of the material receiving pocket within the receptacle.

A further specific object of the invention is to provide a carrier body which may be conveniently loaded at one portion and unloaded at another portion thereof.

Still another object of the invention is to provide an improved truck body structure which is simple, compact and rigid in construction, and which is formed to totally enclose or conceal its contents, while permitting convenient access to the interior thereof.

These and other objects and advantages will appear from the following detailed description.

A clear conception of several embodiments of the invention and of the mode of constructing and of manipulating truck bodies built in accordance therewith, may be had by referring to the drawings accompanying and forming a part of this specification in which like reference characters designate the same or similar parts in the various views.

Fig. 1 is a side elevation of an improved truck body of the longitudinally tiltable type;

Fig. 2 is a transverse vertical section through the truck body of Fig. 1, the section being taken along the line 2—2 of Fig. 1;

Fig. 3 is a fragmentary end view of the truck body of Figs. 1 and 2, looking toward the forward end thereof;

Fig. 4 is a side elevation of a modified form of an improved truck body of the longitudinally tiltable type;

Fig. 5 is a transverse vertical section through the truck body of Fig. 4, the section being taken along the line 5—5 of Fig. 4; and Fig. 6 is a fragmentary end view of the truck body of Figs. 4 and 5, looking toward the forward end thereof.

Referring specifically to the embodiment of the invention disclosed in Figs. 1, 2 and 3, the improved truck body shown therein by way of illustration, comprises in general a bottom 7 having front and rear end portions 8, 9 formed integral therewith and rigidly interconnected at their tops by parallel side angles 10 and an intermediate connecting member 11, adjustable opposite side walls 13 cooperating with the bottom 7 and with the end portions 8, 9 to form a material receiving pocket 12 of variable depth, and doors 14, 15 for enclosing an upper portion of the pocket 12 between the end portions 8, 9.

The body bottom 7 may be formed with an offset 18 for providing sufficient clearance for the supporting wheels 32 and for the hoisting mechanism which is ordinarily utilized to tilt the truck body. When tiltably mounted upon a truck, the truck body is provided with a suitable pivotal support near its rear portion, which support is carried directly by the transporting vehicle. The forward portion 8 of the body is located directly adjacent to the vehicle cab, and may be provided with one or more doors 26 for permitting convenient access to the interior of this forward portion. The top doors 15 are secured to the side angles 10 by means of hinges 17, and have their swinging ends normally supported directly upon the intermediate angle 11 as shown in Fig. 2. The side doors 14 are secured to the upper edges of the vertically adjustable sides 13 by means of hinges 16, and may be swung parallel to the sides 13 as shown at the right of Fig. 2, when the doors 14 are open. The rear portion 9 of the truck body may be provided with the usual cover 28 and door 29, and with mechanism 27 for manipulating the door 29 and for holding the same in open position during unloading of the truck body.

Each of the vertically adjustable walls or sides 13 is provided with a pair of racks 19 located adjacent to the ends thereof, and has its upper end reinforced by means of a ledge 30 and its lower end likewise reinforced by means of a flange 33. The truck bottom 7 is provided with integral upstanding side portions of relatively low height, these side portions being provided at their upper ends with stiffening beads 31 with which the upper ledges 30 of the side walls 13 are cooperable when the side walls are lowered to their extreme position. The disposition of the side walls 13 is such that they may be freely raised or lowered without interfering with the wheels 32, as clearly shown in Fig. 2.

Located laterally adjacent to each of the side walls 13 is a rotary actuating shaft 21 mounted in bearings secured to the end portions 8, 9 and carrying pinions 20 which mesh with racks 19. The pinions 20 and racks 19 may be concealed within housings 25 in order to protect the rack and pinion teeth and to also avoid injury to attendants. The end of each rotary actuating shaft 21 is provided with a ratchet lever 22 whereby the shaft 21 may be intermittently rotated, and each shaft 21 may be additionally provided with a ratchet wheel and with a pawl 24 coacting therewith to lock the shaft 21 against undesirable rotation. The actuating levers 22 may be held in inoperative position by means of clips 23 secured to the forward portion 8 of the truck body.

When the side doors 18 are swung open about their hinges 16 parallel to the side walls 13, they rest directly against the housings 25. By actuating either of the levers 22, the corresponding side wall 13 and side door 14, may be lowered to the limiting position indicated at the right of Fig. 2 and subsequently gradually elevated to increase the effective depth of the pocket 12 by any desired increments. When the side wall 13 is in its lowest position, the top ledge 30 thereof is only slightly above the top of the adjacent wheel 32, and the interior of the truck body is then conveniently accessible from the ground at the side of the vehicle. The increasing of the depth of the pocket 12 may be continued until the flange 33 of the side wall 13 engages the truck body 7 as shown at the left of Fig. 2, whereupon the maximum depth of the pocket 12 has been established. The side doors 14 may then be thrown into closed position, thus completely enclosing the interior of the truck body. During dumping of the body it is only necessary to tilt the same longitudinally, whereupon the doors 28, 29 may be released either manually or automatically to allow the material to slide out of the pocket 12 through the rear portion 9 and from the body.

Referring specifically to the modified embodiment of the invention disclosed in Figs. 4, 5 and 6, the improved truck body comprises in general a bottom 37 having front and rear portions 38, 39 respectively formed integral therewith and rigidly interconnected at their tops by parallel side angles 40 and an intermediate connecting member 41; adjustable opposite side walls 43 cooperating with the bottom 47 and with the end portions 38, 39 to form a material receiving pocket 42 of variable depth; and doors 44, 45 for enclosing the upper portion of the pocket 42 between the end portions 38, 39.

The body bottom 37 may be formed with local offset portions 59 for providing clearance above the supporting wheels 60, and a suitable hoisting mechanism may be provided for tilting the body about a pivot disposed near the rear portion 39. The entire body is ordinarily carried by a truck, and the forward portion 38 is usually located directly adjacent to the vehicle cab. The top doors 45 may be provided with suitable handles and are secured to the side angles 40 by means of hinges 46 pivotally associated with pivot shafts 47. The swinging ends of the top doors 45 are normally supported directly upon the intermediate supporting member 41, and the doors 45 may be swung open when the side doors 44 are closed. The side doors 44 are rigidly attached to the pivot shafts 47, and these shafts are rotatable with the aid of mechanism 48 in order to open and close the doors 44, as indicated in Fig. 6. The rear portion 39 of the truck body, may be provided with the usual doors 57, 58, and with mechanism 56 for actuating the door 58 and for holding the same in open position during unloading of the body.

Each of the vertically adjustable walls or sides 43 is provided with a pair of racks 49 located adjacent to the ends thereof, and is slidable as in the case previously described, in guideways formed in the end portions 38, 39. The upper end of each side wall 43 may be reinforced by means of an angle bar 54, and the lower end may likewise be reinforced by an angle bar 55, these angle bars being cooperable with adjacent portions of the truck body to limit the vertical movement of the side walls. The truck bottom 37 is provided with integral upstanding side portions of relatively low height, the upper ends of which are reinforced by means of angle bars 61, with which the angle bars 54 of the side walls 43 are cooperable to limit the downward movement of the walls as shown in Fig. 5. The formation and disposition of the side walls 43 is such that they may be freely raised or lowered without interfering with the wheels 60, as shown in Fig. 5.

Located laterally adjacent to each of the side walls 43, is a rotary actuating shaft 51 mounted in bearings secured to the end portions 38, 39 and carrying pinions 50 which mesh with the racks 49. The pinions 50 and the racks 49 may be concealed within housings 53 in order to protect the rack and pinion teeth and to also avoid possible injury to attendants. The forward end of each of the rotary actuating shafts 51 is provided with a ratchet lever 52 whereby the shafts may be intermittently rotated, and each shaft 51 may be additionally provided with a ratchet wheel and pawl 62 for locking the shaft 51 against undesirable rotation. The actuating levers 52 may be positively held against the forward portion 38 of the truck, in any suitable manner.

When the side doors 44 are swung open about the axes of the shafts 47, by manipulation of the mechanism 48, they rest upon the handles of the adjacent doors 45, but in this modification it is not necessary to open the side doors 44 in order to permit raising or lowering of the walls 43.

By actuating either of the levers 52, the corresponding side wall 53 may be lowered to the limiting position indicated at the right of Fig. 5, and subsequently gradually elevated to increase the effective depth of the pocket 42 to any desired extent. With either of the side walls 43 in its lowermost position, the top angle 54 thereof is only slightly above the top of the adjacent wheel 60, and the interior of the truck body is then conveniently accessible from the ground at that side of the vehicle. The increase in depth of the pocket 42 may be continued until the reinforcing angle 54 thereof meets the adjacent side door 44, and the lower reinforcing angle 55 thereof engages the truck bottom 37. With the side walls 43 elevated and the doors 44, 45 closed, the truck body is completely enclosed, thus especially adapting the truck body for use in collecting garbage. During dumping of the truck body, it is only necessary as in the case previously described, to tilt the same longitudinally, whereupon the end doors 57, 58 may be released either manually or automatically to allow the material to slide rearwardly out of the pocket 42.

From the foregoing description it will be apparent that the present invention provides a truck body which may be readily loaded with any kind of material, by hand and from the ground level. The side walls of the body may be conveniently raised as material is deposited within the receiving pocket, and the improved truck body may be conveniently loaded at the sides and unloaded at the rear thereof. The top and side doors while permitting free access to the interior of the truck body, provide closures for concealing the contents of the body, and these doors may be readily manipulated without disturbing the adjustable side walls. The entire structure is extremely rigid and may be utilized either with or without tilting mechanism of the usual form mounted directly beneath the body.

It should be understood that it is not desired to limit the invention to the exact details of construction herein shown and described, for various modifications within the scope of the claims may occur to persons skilled in the art.

It is claimed and desired to secure by Letters Patent:

1. In a truck body, relatively low side wall portions fixedly attached to the body and having reinforced upper edges, and side walls slidable vertically closely adjacent to said fixed wall portions and having similarly reinforced upper edges movable over and in close proximity to said reinforced fixed wall portion edges.

2. In a truck body, relatively low side wall portions fixedly attached to the opposite sides of said body and having inwardly curved upper edges, and side walls movable vertically closely adjacent to said fixed wall portions and having similarly curved upper edges movable over and in close proximity to said curved fixed wall portion edges.

3. In a truck body, relatively low side wall portions fixedly attached to the body and having reinforced upper edges, side walls permanently attached to the body and slidable vertically closely adjacent to said fixed wall portions and having similarly reinforced upper edges movable over and in close proximity to said reinforced fixed wall portion edges, and mechanism for moving said side walls.

4. In a truck body, relatively low side wall portions fixedly attached to the opposite sides of said body and having inwardly curved upper edges, side walls permanently attached to the body and movable vertically closely adjacent to said fixed wall portions and having similarly curved upper edges movable over and in close proximity to said curved fixed wall portion edges, and mechanism for moving said side walls.

5. In a truck body, relatively low side wall portions rigidly attached to the body and having reinforced upper edges, side walls movable upwardly adjacent to said rigid wall portions and having similarly reinforced upper edges movable downwardly into close proximity to said reinforced rigid wall portion edges, and cover doors movable into engagement with said reinforced movable side wall edges when the latter are in uppermost position of adjustment.

6. In a truck body, relatively low side wall portions rigidly attached to the body and having inwardly curved upper edges, side walls movable upwardly adjacent to said rigid wall portions and and having inwardly curved upper edges, movable downwardly into close proximity to said curved rigid wall portion edges, and cover doors swingable into engagement with said inwardly curved movable side wall edges when the latter are in uppermost position of adjustment.

7. In a truck body, a low fixed side wall having a reinforced upper edge, a side wall movable upwardly adjacent to said fixed wall and having an inwardly curved upper edge movable into close proximity to said reinforced fixed wall edge, and a cover door pivotally attached to the body and swingable into engagement with said inwardly curved edge when said movable wall is in uppermost position.

8. In a truck body, a low side wall having a reinforced upper edge, a higher side wall movable upwardly adjacent to said low wall and having a reinforced upper edge movable into close proximity to said reinforced low wall edge, and a cover door movable into engagement with said reinforced high wall edge when said movable wall is in uppermost position.

9. In a truck body, a low side wall having a reinforced upper edge, and a high side wall movable in close proximity to said low wall and having a reinforced upper edge movable over and in close proximity to said reinforced low wall edge.

10. In a truck body, a low side wall having a reinforced upper edge, a high side wall movable in close proximity to said low wall and having a reinforced upper edge movable over and in close proximity to said reinforced low wall edge, and mechanism carried by the body for moving said high wall.

11. In a truck body, a low side wall having a reinforced upper edge, a higher side wall movable upwardly adjacent to said low wall and having a reinforced upper edge movable into close proximity to said reinforced low wall edge, a cover door movable into engagement with said reinforced high wall edge when said movable wall is in uppermost position, and mechanism carried by the body for moving said high wall in contact with said cover.

JULIUS P. HEIL.